Patented Jan. 6, 1925.

1,522,112

UNITED STATES PATENT OFFICE.

ROBERT O. FRIEND, OF CHICAGO, ILLINOIS.

PROCESS FOR TREATING GLAUCONITE OR GREENSAND.

No Drawing.  Application filed January 23, 1924.  Serial No. 688,100.

*To all whom it may concern:*

Be it known that I, ROBERT O. FRIEND, a citizen of the United States, residing at Chicago, in the county of Cook and State of Illinois, have invented certain new and useful Improvements in Processes for Treating Glauconite or Greensand, of which the following is a specification.

This invention has for its object to provide a simple, cheap and efficient process for preparing natural base exchange silicates, and particularly glauconite or greensand, for softening water for household and industrial purposes and, further, to so prepare said silicates for such use as to enable it to be revivified by means of common salt brine.

In its natural state the glauconite or greensand has a potassium base. By filtering hard water through a mass of the mineral, after having separated foreign substances, such as clay, earth and the like therefrom, the mineral will take up the hard salts of the water, viz; the calcium and magnesium salts thereof, and yield up to the water in exchange therefor, its potassium base. The resultant water is of substantially zero hardness but in the process it becomes badly discolored, usually issuing as a bright green, murky liquid.

After the potassium base of the mineral is exhausted, the water filtered through the mass thereof will remain unchanged as to its hard salts content. The mineral may be then revivified and its original water softening powers completely restored by passing a potassium chloride solution therethrough, a substantially saturated solution being preferable and the quantity of potassium chloride required being from about 30 to 40 grains per pound of the mineral.

By using a substantially similar amount of sodium chloride in solution through the mass, revivification will also result but the original exchange base of the mineral is then converted from potassium to sodium.

The reactions, which are very rapid, are substantially, that the mineral yields up its exchange base to the water and takes up from the latter the calcium and magnesium until all of the exchange base has been exhausted. By now passing a chloride salt solution through the bed, as aforesaid, the chlorine of the solution combines with the calcium and magnesium salts to convert them into soluble chloride salts which pass off in solution while the base salt of the solution (potassium or sodium) is taken up by the mineral.

These alternate reactions will proceed indefinitely as will also discoloration of the water as aforesaid. Filtration of the softened water will effect more or less clarification thereof but will not eliminate the discoloration appreciably. Hence, the water is not well adapted for either domestic or industrial purposes.

By subjecting the glauconite, or greensand to the action of a hot caustic soda solution in the presence of agitation, using substantially one pound of caustic soda per one hundred pounds of the mineral, with just sufficient water to produce a substantially saturated solution (from five to ten degrees Baumé) of a temperature ranging preferably from about 150 to 210 degrees Fahrenheit and maintaining the agitation or stirring of the mineral in the solution for fifteen minutes or more and then thoroughly washing it with water at substantially the same temperature as that of the solution, a very thorough cleansing of the mineral is first effected and it will be found to have undergone some physical or chemical change, the nature of which I have not ascertained. A longer immersion in the caustic solution seems to have neither a beneficial nor a deleterious effect on the mineral, and though the temperature of the solution may be below one hundred fifty degrees Fahrenheit with a proportionately longer immersion of the mineral therein, the higher temperature range is more advantageous. Washing with cold water in place of hot water may also be resorted to without disadvantage except to the extent that more water and a longer period of time are required to completely eliminate causticity from the mineral.

After washing to the extent last mentioned, the mineral is allowed to drain for an hour or more and is then immersed in a dilute sodium silicate of a strength of preferably 42 degrees Baumé, using about four-fifths to nine-tenths pound of the solution per 100 pounds of the mineral. The solution is preferably heated to about 150° to 200° Fahrenheit and the mineral maintained immersed therein for ten minutes or more, longer immersion having neither a beneficial nor a deleterious effect thereon. A longer immersion is preferable if the temperature maintained is lower than 150° Fahrenheit.

The mineral is then again thoroughly washed with hot or cold water until all traces of sodium silicate are absent from the wash water, and is then ready for use in the production of clear, undiscolored soft water adapted for domestic and industrial purposes.

Preferably, before filtering hard water through a mass of the treated mineral for softening, the latter is subjected to the action of common salt brine, preferably saturated and containing not less than about forty grains of pure salt per pound of the mineral, by merely filtering said brine through the mass. The latter is then again washed with cold water until all trace of salt is absent from the wash water. Hard water to be softened for domestic or industrial purposes, may now be filtered through the mineral until a test indicates that the resultant water is of more than about two to four grains hardness. The well known soap test may be used for this purpose and also to determine the presence of sodium chloride in the wash water.

If the soap test indicates that the resultant water is more or less hard, within substantially the aforesaid limit, the passage of salt brine through the mass will effect restoration of the softening properties of the mineral, the flushing out of the brine always following the passage of the latter.

Preferably, however, after immersion in the sodium silicate solution, the mineral is first allowed to drain and is then dried under temperature conditions not exceeding about 250° Fahrenheit until it is in condition for screening, it being advisable to screen out all particles that will pass through a fifty-mesh screen.

The mineral may be successfully used in such apparatus as is described and illustrated in my pending applications for patents, Serial Nos. 666,610 filed October 4, 1923 and 636,367, filed May 3, 1923, respectively.

The above described process is capable of some variation and modification without departing from the invention as defined in the appended claims.

I claim as my invention:—

1. The process of treating glauconite or greensand for water softening purposes which includes subjecting the same to the action of a substantially five to ten degrees Baumé solution of caustic soda at a temperature less than the boiling point of water.

2. The process of treating glauconite or greensand for water softening purposes which includes subjecting the same to the action of a substantially five to ten degrees Baumé solution of caustic soda at a temperature less than the boiling point of water, thereafter washing the same until all trace of causticity is absent from the wash water, and then immersing the same in a dilute solution of sodium silicate at a temperature less than the boiling point of water.

3. The process of treating glauconite or greensand for water softening purposes which includes subjecting the same to the action of a substantially five to ten degrees Baumé solution of caustic soda at a temperature less than the boiling point of water and for a period of fifteen minutes or more.

4. The process of treating glauconite or greensand for water softening purposes which includes subjecting the same to the action of a substantially five to ten degrees Baumé solution of caustic soda at a temperature less than the boiling point of water and for a period of fifteen minutes or more, then washing the same until all trace of causticity is absent from the wash water, and then immersing the same in a dilute solution of sodium silicate at a temperature less than the boiling point of water.

5. The process of treating glauconite or greensand for water softening purposes which consists in the successive steps of subjecting the same to the action of a caustic alkali solution, then washing the same with fresh water, then subjecting it to the action of a sodium salt solution, and then again washing the same with fresh water, all of said steps being performed at a temperature less than the boiling point of water.

ROBERT O. FRIEND.